(12) United States Patent
Vicars

(10) Patent No.: US 6,767,132 B2
(45) Date of Patent: Jul. 27, 2004

(54) CONNECTING ROD BEARING

(75) Inventor: Berton L. Vicars, Odessa, TX (US)

(73) Assignee: Gardner Denver, Inc., Quincy, IL (US)

( * ) Notice: Subject to any disclaimer, the term of this patent is extended or adjusted under 35 U.S.C. 154(b) by 28 days.

(21) Appl. No.: 10/135,369

(22) Filed: May 1, 2002

(65) Prior Publication Data

US 2003/0206671 A1 Nov. 6, 2003

(51) Int. Cl.[7] .............................................. F16C 33/04
(52) U.S. Cl. ..................................... 384/294; 384/295
(58) Field of Search ................................ 384/288, 294, 384/295, 432, 434

(56) References Cited

U.S. PATENT DOCUMENTS

| 2,082,944 A | 6/1937 | Evans |
| 4,073,550 A | 2/1978 | Yahraus |
| 4,114,961 A | 9/1978 | Pithie |
| 6,176,621 B1 * | 1/2001 | Naitoh et al. ................ 384/288 |

FOREIGN PATENT DOCUMENTS

| DE | 855481 | 11/1952 |
| DE | 1246332 | 8/1967 |
| NL | 86132 | 8/1957 |

* cited by examiner

Primary Examiner—Lenard Footland
(74) Attorney, Agent, or Firm—James B. Conte; Barnes & Thornburg

(57) ABSTRACT

A connecting rod bearing including a housing with an attaching portion and a retaining portion releasably joined together so as to define a transverse passageway. The attaching portion and the retaining portion are each provided with a pair of bores. The bores are respectively located on opposite sides of the transverse passageway and can be brought into registry with one another. The bores also partially intersect the transverse passageway. A pair of alignment pins is positioned within a respective one of the bores and project into the transverse passageway. A sleeve is positioned within the transverse passageway and has notches for snugly receiving the alignment pins.

8 Claims, 2 Drawing Sheets

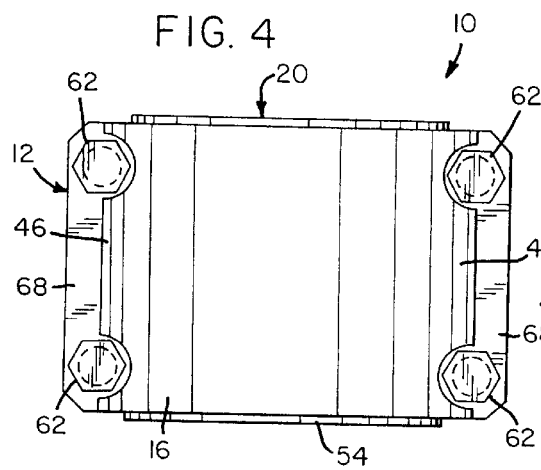
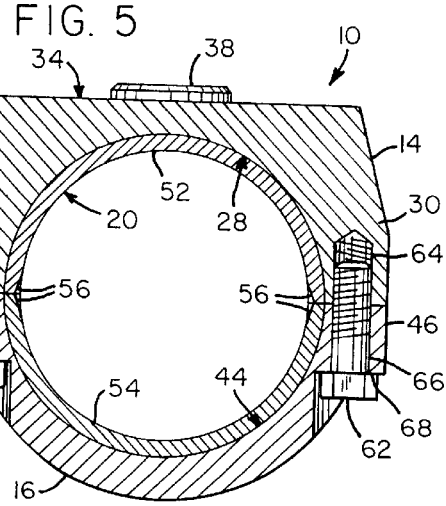
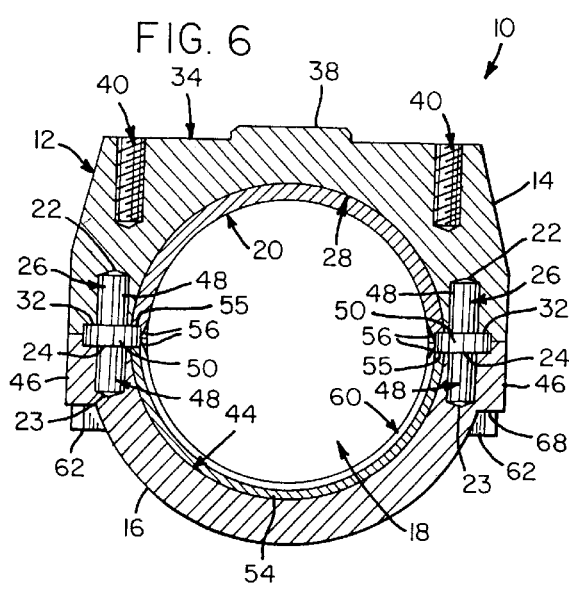
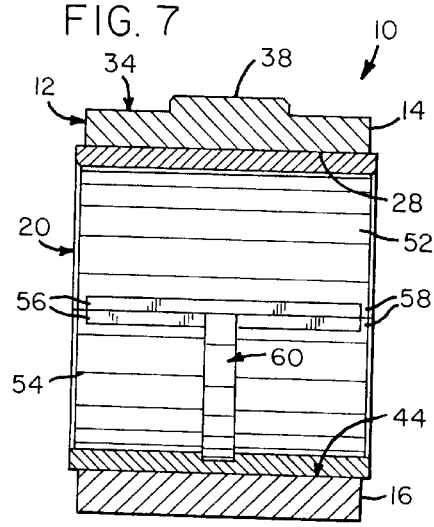

under the US 6,767,132 B2

CONNECTING ROD BEARING

FIELD OF THE INVENTION

The present invention relates generally to rotary bearings and, more particularly, to mountings or supports for such bearings on connecting rods.

BACKGROUND OF THE INVENTION

It is difficult to economically produce oil and gas from low permeability reservoir rocks. Hydraulic fracturing, a technique that increases rock reservoir permeability, often increases recovery rates, however. During hydraulic fracturing, a fluid is pumped into the earth under high pressure where it enters a reservoir rock and fractures it. Proppants are carried in suspension by the fluid into the fractures. When the pressure is released, the fractures partially close on the proppants leaving channels for oil and gas to flow to recovery wells.

Specialized pumps are used to develop the pressures necessary to complete a hydraulic fracturing procedure or "frac job." These pumps are usually provided with bearings that couple a number of like connecting rods to a crankshaft. These bearings usually incorporate bronze sleeves that encircle the crankshaft and prevent binding during normal use. Improper design of these sleeves, however, can restrict the flow of lubricant to their bearing surfaces. If flow is fully impeded, the sleeves and the pump can be severely damaged. Damage may be caused by the sleeves seizing upon the crankshaft so that their exterior surfaces grind away in their housings and by galling where their bearing surfaces are worn away by direct contact with the crankshaft. In either case, the affected pump must be immediately shut down and the bearings repaired. Such an event can be exceedingly time consuming and costly for an oilfield operator.

SUMMARY OF THE INVENTION

In light of the problems associated with the known connecting rod bearings, it is a principal object of the invention to provide a new connecting rod bearing that enhances the flow of lubricant across its bearing surface so as to prevent galling and other forms of damage by friction. Use of the new connecting rod bearing, then, will: minimize the likelihood of pump breakdowns, prolong pump life, reduce costs, and optimize profits.

It is a further object of the present invention to provide a connecting rod bearing of the type described whose crankshaft-engaging sleeve cannot under normal operating conditions rotate relative to its housing. In other words, the outer surface of the sleeve cannot be caused to grind away against the housing so as to result in a premature bearing failure.

It is another object of the invention to provide a bearing of the type described that is: self-aligning, easy to assemble, and quick to install on a connecting rod. Both assembly and installation can be accomplished with few tools and by laborers with minimal training.

It is an object of the invention to provide improved elements and arrangements thereof in a connecting rod bearing for the purposes described which is lightweight in construction, inexpensive to manufacture, and fully dependable in use.

Briefly, the bearing in accordance with this invention achieves the intended objects by featuring a housing having an attaching portion with an alignment plug extending therefrom and a retaining portion bolted to the attaching portion so as to define a transverse passageway. The attaching and retaining portions are each provided with a pair of bores respectively located on opposite sides of the passageway. The bores may be brought into alignment with one another and partially intersect the passageway. A pair of alignment pins is positioned in the bores and project into the passageway. A sleeve is positioned within the passageway and has a pair of C-shaped parts the ends of which are provided with notches for receiving the pins. The C-shaped parts are also provided with beveled areas adjacent the notches that define liquid lubricant reservoirs extending across the sleeve. A channel connects the beveled areas of one of the C-shaped parts to provide fluid communication between the lubricant reservoirs.

The foregoing and other objects, features and advantages of the present invention will become readily apparent upon further review of the following detailed description of the preferred embodiment as illustrated in the accompanying drawings.

BRIEF DESCRIPTION OF THE DRAWINGS

The present invention may be more readily described with reference to the accompanying drawings, in which:

FIG. 4 is a bottom view of the connecting rod bearing.

FIG. 5 is a cross-sectional view taken along line 5—5 of FIG. 3.

FIG. 6 is a cross-sectional view taken along line 6—6 of FIG. 3.

FIG. 7 is a cross-sectional view taken along line 7—7 of FIG. 1.

Similar reference characters denote corresponding features consistently throughout the accompanying drawings.

DETAILED DESCRIPTION OF THE PREFERRED EMBODIMENT

Figure 1:
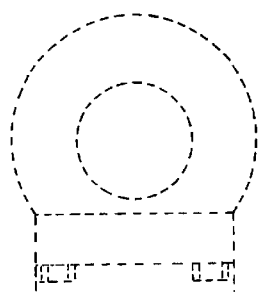
FIG. 1 is a side elevational view of a connecting rod bearing in accordance with the present invention mounted on a connecting rod.
Figure 2:
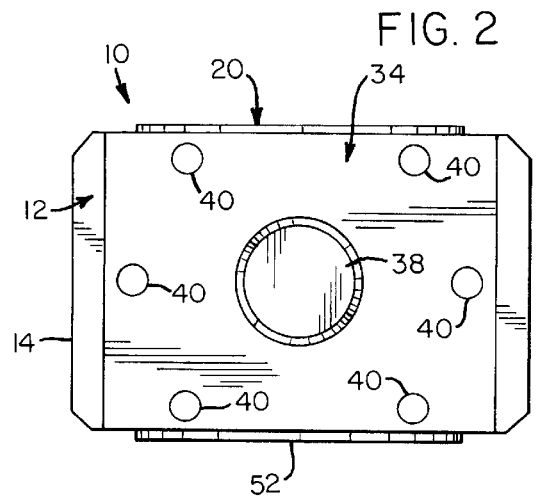
FIG. 2 is a top view of the connecting rod bearing of FIG. 1.
Figure 3:
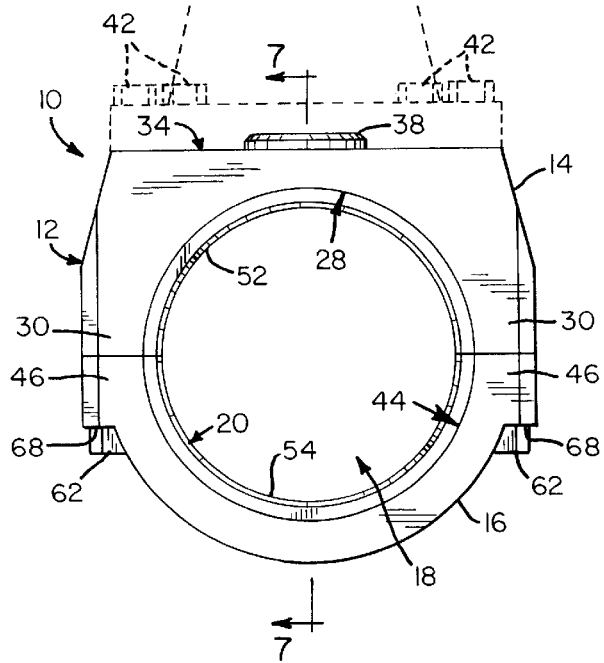
FIG. 3 is a side view of the connecting rod bearing with both side views being mirror images of one another.
Figure 3:
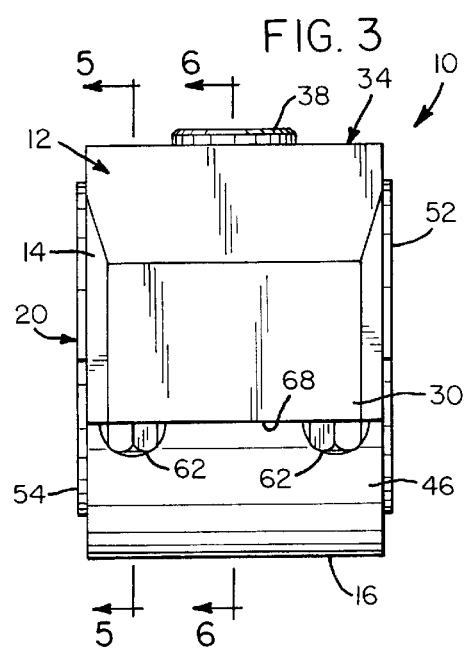

Referring now to the FIGS., a connecting rod bearing in accordance with the present invention is shown at 10. Bearing 10 includes a housing 12 with an attaching portion 14 and a retaining portion 16 joined together so as to define a transverse passageway 18 within which a tubular sleeve 20 is clamped. The opposed sides of portions 14 and 16 are provided with bores 22 and 24 for receiving a pair of alignment pins 26 that ensure the perfect alignment of portions 14 and 16 with one another. Pins 26 project into passageway 18 so as to engage sleeve 20 and prevent it from rotating in passageway 18.

Attaching portion 14 comprises a metal block from the bottom of which a piece has been removed so as to define a semicircular wall 28 bounded on opposite sides by a pair of downwardly extending legs 30. The bottoms of legs 30 are each provided with an upwardly extending bore 22. Each bore 22 includes a countersunk part 32 of increased diameter at its entryway that intersects semicircular wall 28.

Attaching portion 14 is provided with a planar top surface 34 for abutment with one end of a connecting rod 36. An alignment plug 38 extends upwardly from the center of surface 34. Alignment plug 38 is a solid cylinder that fits snugly and fully into a close-fitting socket (not shown) in connecting rod 36 to ensure the centering of attaching portion 14 on rod 36. Preferably, six, threaded bores 40 penetrate surface 34 adjacent plug 38 and are positioned for alignment with holes (not shown) of similar diameter in rod 36. When six retaining bolts 42 are extended through the holes in rod 36 into bores 40, portion 14 may be releasably attached to rod 36.

Retaining portion 16 comprises a metal block from the top of which a piece has been removed so as to define a semicircular wall 44 bounded on opposite sides by a pair of upwardly extending legs 46. As shown, semicircular wall 44 has a radius of curvature equal to that of semicircular wall 28 in attaching portion 14 so as to provide passageway 18 with a circular cross section. The tops of legs 46 are each provided with a downwardly extending bore 23 for registry with bore 22. Each bore 23 includes a countersunk part 24 of increased diameter at its entryway that intersects semicircular wall 44. Countersunk part 24 has the same diameter as countersunk part 32.

Each of the alignment pins 26 is formed of metal and provided with an elongated shaft 48 and an enlarged collar 50 integrally formed at the midpoint of shaft 48. Each shaft 48 is sized for full, mated engagement with aligned bores 22 and 23 in portions 14 and 16. Also, each collar 50 is sized for snug positioning within countersunk parts 24 and 32. Thus, when alignment pins 26 are positioned in bores 22 and 23, legs 30 and 46 may be abutted against one another thereby bringing portions 14 and 16 into perfect alignment.

Countersunk parts 24 and 32 are positioned to intersect semicircular walls 28 and 44 in registry with one another so as to make a pair of openings at the junctions of the walls 28 and 44. The collars 50 of pins 26, having diameters like those of parts 24 and 32 project through these openings into passageway 18.

Sleeve 20 is formed from a pair of C-shaped parts 52 and 54 each comprising one-half of a tube cut lengthwise. The ends of parts 52 and 54 are each provided with a notch 55 that snugly engages the portion of collar 50 of an alignment pin 26 that projects into passageway 18. Each collar 50, thus, serves as a key to prevent the rotation of parts 52 and 54 and to ensure their proper alignment relative to one another and to portions 14 and 16 of housing 12.

The ends of parts 52 and 54 are each provided with a beveled area 56 that, when positioned side-by-side as illustrated in FIG. 6, form a liquid lubricant reservoir extending across the width of sleeve 20. Preferably, the sides of each beveled area 56 are inset somewhat from the sides of parts 52 and 54 thereby forming side walls 58 that prevent lubricant from spilling from sleeve 20. A groove or channel 60 extends circumferentially around part 54 to intersect the beveled areas 56 of part 54. Channel 60 not only provides a lubricant collection and distribution pathway, but it connects the two lubricant reservoirs together to ensure that each is provided with similar quantities of lubricant under similar pressures.

Sleeve 20 is removed from housing 12 by disassociating the attaching and retaining portions 14 and 16 from one another. As shown, attaching and retaining portions 14 and 16 are releasably fastened to one another by four bolts 62 that extend into aligned apertures 64 and 66 in legs 30 and 46. Apertures 64 are threaded to threadably engage bolts 62. Shoulders 68 in legs 46 provide a seat for the heads of bolts 62.

Use of bearing 10 is straightforward with its installation in a pump being accomplished in a conventional manner. Once the pump is caused to run, bearing 10 is supplied with pressurized lubricating oil via passageways within the crankshaft grasped by sleeve 20. This oil tends to fill channel 60 which, then, conveys the oil to the reservoirs formed by beveled areas 56. Thus, relatively large volumes of oil are maintained between the crankshaft and sleeve 20 tending to: minimize frictional forces, keep operating bearing temperatures low, and prolong bearing life.

Since collars 50 of alignment pins 26 engage parts 52 and 54 of sleeve 20, the crankshaft cannot rotate sleeve 20 within housing 12. Furthermore, the engagement of pins 26 with parts 52 and 54 ensures that the alignment of sleeve 20 relative to housing 12 is flawless. Abnormal wear of sleeve 20 is, therefore, unlikely to occur.

While the invention has been described with a high degree of particularity, it will be appreciated by those skilled in the art that modifications may be made thereto. Therefore, it is to be understood that the present invention is not limited to the sole embodiment described above, but encompasses any and all embodiments within the scope of the following claims.

I claim:

1. A connecting rod bearing, comprising: a housing having an attaching portion with an alignment plug extending therefrom and a retaining portion bolted to said attaching portion so as to define a transverse passageway of circular outline, said attaching portion and said retaining portion each being provided with a pair of countersunk bores respectively located on opposite sides of said transverse passageway and aligned with one another, said bores partially intersecting said transverse passageway;

a pair of alignment pins each having a shaft and an enlarged collar at the midpoint thereof, each said shaft being positioned in one said countersunk bore in said attaching portion and one said countersunk bore in said retaining portion with each said collar projecting into said transverse passageway; and, a sleeve positioned within said transverse passageway and having a pair of C-shaped parts the ends of which are provided with notches for snugly receiving said collars of said alignment pins and with beveled areas adjacent said notches and bounded by side walls that define a liquid lubricant reservoir extending across said sleeve.

2. The connecting rod bearing according to claim 1 wherein one of said C-shaped parts is provided with a channel that intersects said beveled areas thereof.

3. A connecting rod bearing, comprising:

a housing having an attaching portion and a retaining portion releasably joined together so as to define a transverse passageway, said attaching portion and said retaining portion each being provided with a pair of bores respectively located on opposite sides of said transverse passageway that can be brought into registry with one another, said bores partially intersecting said transverse passageway; a pair of alignment pins each positioned within a respective one of said bores and projecting into said transverse passageway; and a sleeve positioned within said transverse passageway and having notches for snugly receiving said alignment pins;

wherein said sleeve includes a pair of C-shaped parts the ends of each of which are provided with beveled areas that define a pair of liquid lubricant reservoirs extending across the width of said sleeve; and wherein one of said C-shaped parts is provided with a channel that intersects said beveled areas thereof.

4. A connecting rod bearing, comprising:

a housing having an attaching portion and a retaining portion releasably joined together so as to define a transverse passageway, said attaching portion and said retaining portion each being provided with a pair of bores respectively located on opposite sides of said transverse passageway that can be brought into registry with one another, said bores partially intersecting said transverse passageway; a pair of alignment pins each positioned within a respective one of said bores and projecting into said transverse passageway; and a sleeve positioned within said transverse passageway and having notches for snugly receiving said alignment pins;

an alignment plug extending from said attaching portion for insertion into a close-fitting socket in a connecting rod.

5. A connecting rod bearing, comprising:

a housing having an attaching portion and a retaining portion bolted together so as to define a transverse passageway, said attaching portion and said retaining portion each being provided with a pair of countersunk bores respectively located on opposite sides of said transverse passageway aligned with one another, said bores partially intersecting said transverse passageway;

a pair of alignment pins each having a shaft and an enlarged collar at the midpoint thereof, each of said alignment pins being positioned in one pair of said countersunk bores being aligned with one another and each said collar projecting into said transverse passageway; and a sleeve positioned within said transverse passageway and having notches for snugly receiving each said collar of said alignment pins.

6. The connecting rod bearing according to claim 5 wherein said sleeve includes a pair of C-shaped parts the ends of which are provided with beveled areas that define liquid lubricant reservoirs extending across the width of said sleeve.

7. The connecting rod bearing according to claim 6 wherein one of said C-shaped parts is provided with a channel that intersects and connects said beveled areas thereof.

8. The connecting rod bearing according to claim 5 further comprising an alignment plug extending from said attaching portion for insertion into a close-fitting socket in a connecting rod.

* * * * *